United States Patent
Jacob

(10) Patent No.: US 6,267,683 B1
(45) Date of Patent: Jul. 31, 2001

(54) ASSEMBLY HAVING A CONSTANT VELOCITY JOINT AND A RECEIVING PART

(75) Inventor: Werner Jacob, Frankfurt (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 09/522,660

(22) Filed: Mar. 10, 2000

(30) Foreign Application Priority Data

Mar. 12, 1999 (DE) .................................. 199 11 113

(51) Int. Cl.$^7$ ........................................ F16D 3/16
(52) U.S. Cl. ..................... 464/145; 464/906; 464/141
(58) Field of Search ........................ 464/140, 141, 464/142, 143, 145, 906; 29/898.066

(56) References Cited

U.S. PATENT DOCUMENTS

| | | | |
|---|---|---|---|
| 3,106,077 | * 10/1963 | Sharp | 464/906 |
| 3,204,429 | * 9/1965 | Kayser | 464/141 |
| 3,367,139 | * 2/1968 | Ristau | 464/145 |
| 4,000,629 | * 1/1977 | Bellomo | 464/906 |
| 5,334,096 | * 8/1994 | Iwao | 464/906 |

FOREIGN PATENT DOCUMENTS

| | | |
|---|---|---|
| 40 42 390 C2 | 7/1995 | (DE) . |
| 43 10 008 C2 | 7/1996 | (DE) . |
| 296 16 432 U1 | 12/1996 | (DE) . |
| 297 21 218 U1 | 4/1998 | (DE) . |
| 0 463 531 A1 | 1/1992 | (EP) . |
| 2 295 440 | 5/1996 | (GB) . |
| 2 331 572 | 5/1999 | (GB) . |
| 9-151950 | 6/1997 | (JP) . |

\* cited by examiner

*Primary Examiner*—Lynne H. Browne
*Assistant Examiner*—Aaron M Dunwoody

(57) ABSTRACT

The invention relates to an assembly having a constant velocity joint (1) and a receiving part (16). The constant velocity joint (1) comprises an outer part (2), an inner part (7), a cage (12) and balls (13). The outer part (2), on its outer face, is provided with a centering face (14) by means of which the outer part (2) is centrically received in a centering bore (17) of a receiving part (16). The flange (5) is tensioned against a contact face of the receiving part (16) by fixing bolts (20). The outer part (2) is produced from plate metal by a non-chip producing forming operation. Because of the type of arrangement, it can be correspondingly lighter in weight than a solid part incorporated for the transmission of the same amount of torque.

6 Claims, 4 Drawing Sheets

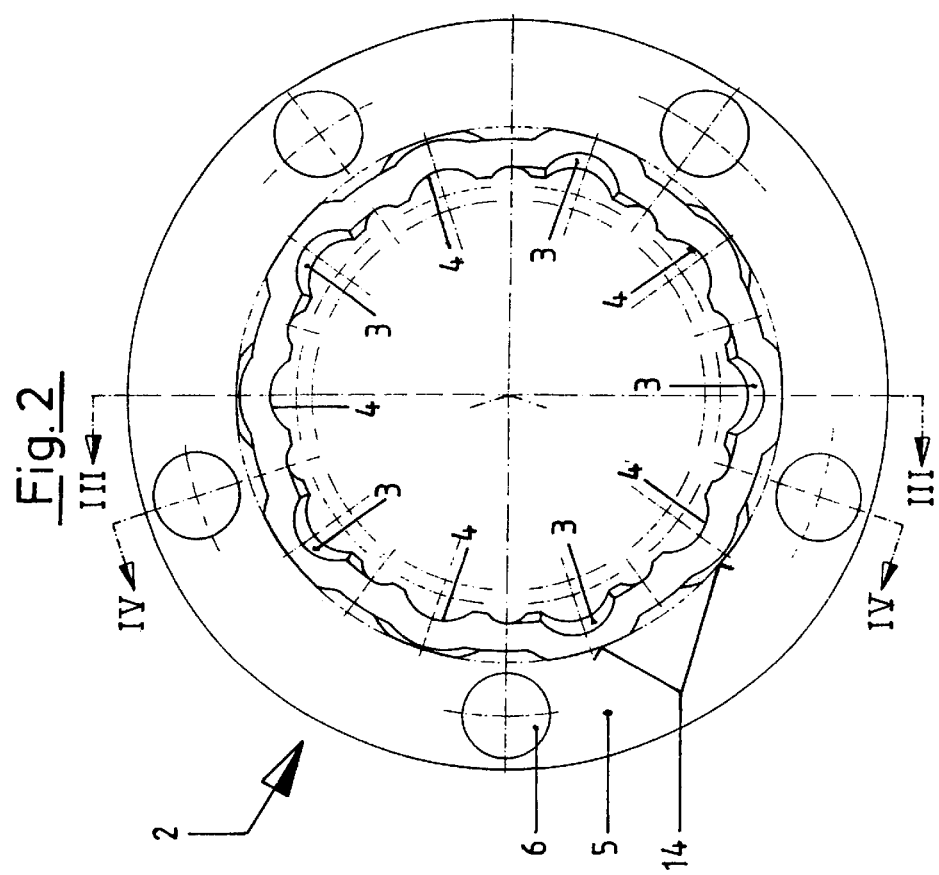
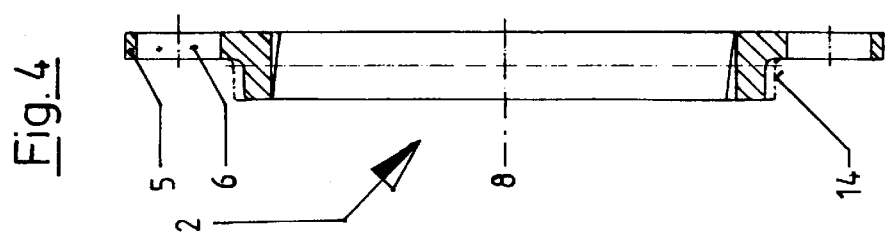
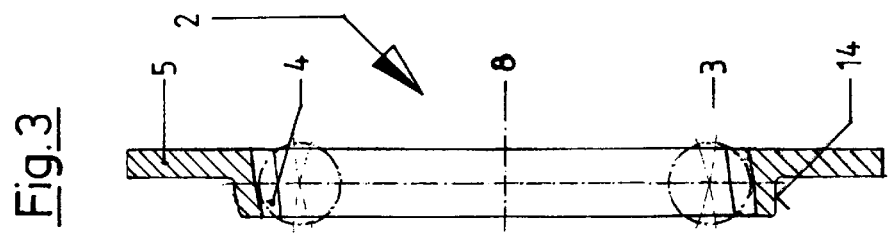

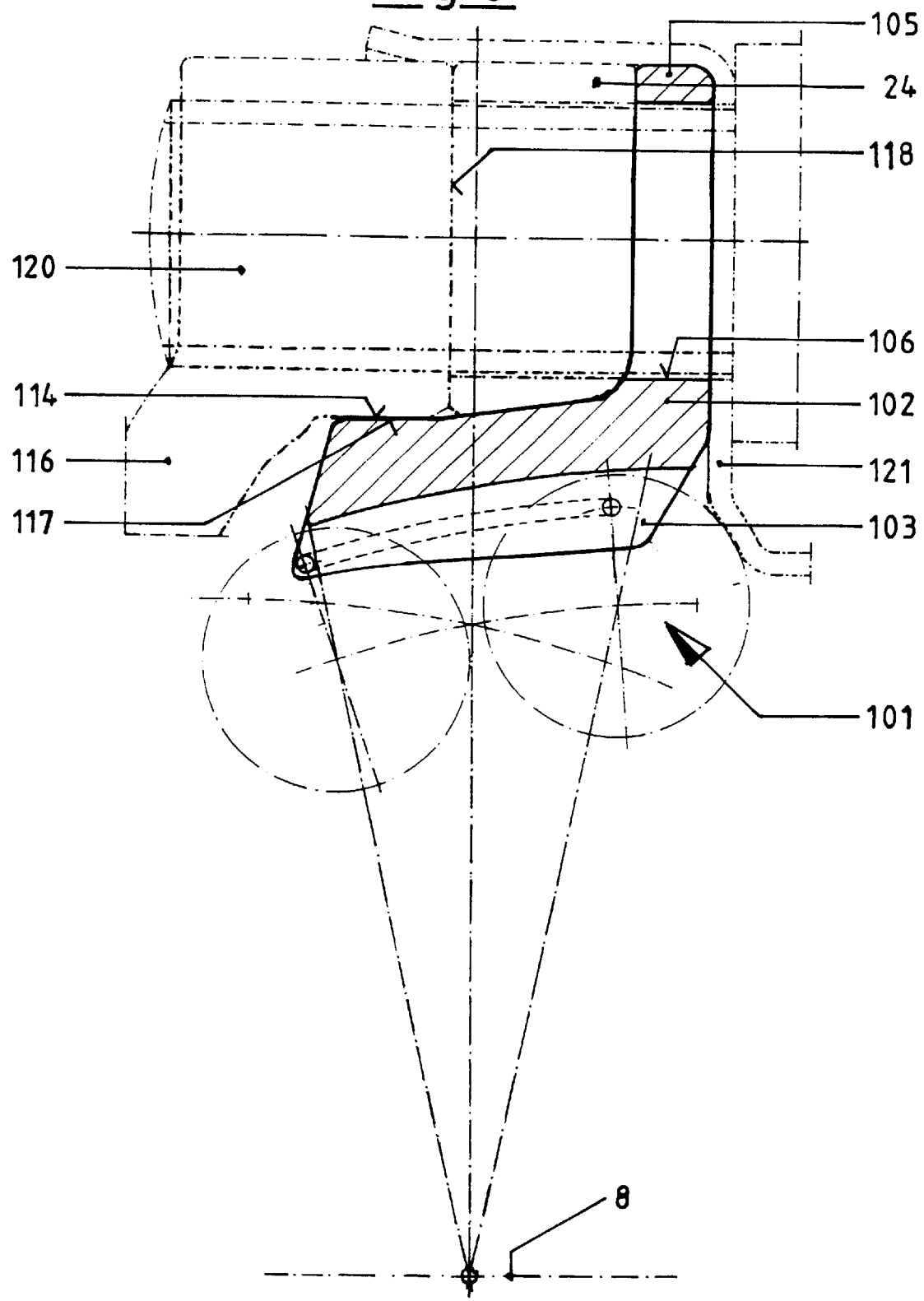

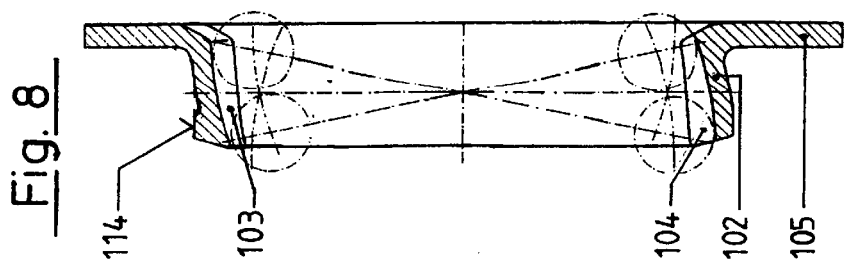
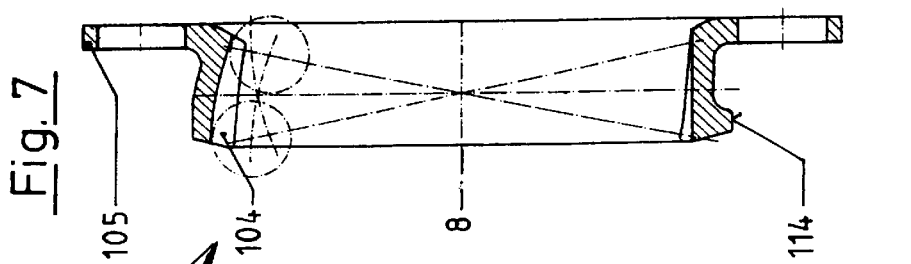
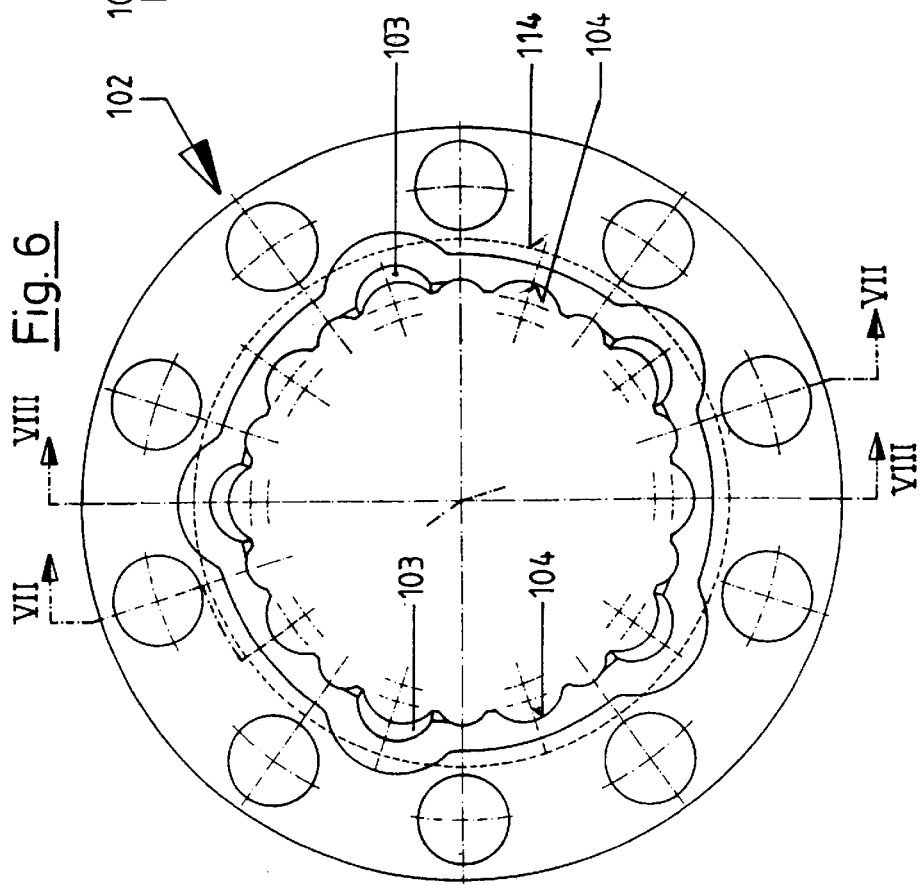

ASSEMBLY HAVING A CONSTANT VELOCITY JOINT AND A RECEIVING PART

BACKGROUND OF THE INVENTION

The invention relates to an assembly which comprises a constant velocity joint and a receiving part. The receiving part serves to receive the outer part of the constant velocity joint.

DE 40 42 390 C2 describes a constant velocity joint with an outer part which is produced as a solid formed part and is approximately annular in shape. The annular cage comprises a hollow spherical inner face. The cage is axially slotted, so that it can be mounted on the spherical outer face of the inner part. Furthermore, the cage comprises a spherical outer face which is enclosed by hollow spherical partial faces of the outer part, so that, for mounting purposes, the outer part is axially divided, as a result of which there are obtained two annular segments. After the inner part, cage and outer part have been mounted, the unit is inserted into a receiving part which encloses the outer face of the outer part. A rotationally fast connection between the outer part and the receiving part is achieved in that the receiving part is formed into recesses in the outer face of the outer part. There is thus obtained a positive, form-fitting connection.

It is an object of the invention to provide an assembly having a constant velocity joint and a receiving part, which assembly permits a lightweight design of the constant velocity joint.

SUMMARY OF THE INVENTION

In accordance with an embodiment of the invention, the objective is achieved by providing an assembly having a constant velocity joint which comprises an outer part which is axially open at both ends, an inner part, a cage and balls. The outer part and the inner part are provided with running grooves for receiving balls, and the cage serves to guide the balls. Furthermore, the outer part is formed of plate metal and, at one axial end, comprises a formed-on flange. Towards the other axial end, on its outside, the outer part is provided with a cylindrical centering face. Furthermore, the flange is provided with through-bores for fixing bolts. A receiving part is also included which comprises a cylindrical centering bore for centrically receiving the outer part by means of the centering face, and threaded bores which are arranged so as to correspond to the through-bores. The fixing bolts are threadable into the threaded bores of the receiving part.

One advantage of the above embodiment is that the outer part can be formed from plate metal in a non-chip producing way. The dimensional stability is ensured at one axial end by the flange and, at the other axial end, by the receiving part being in which the outer part is received in a centered way, so that even if the constant velocity joint is subjected to high loads when under torque or operating at an angle, deformation at the outer part occurs to the required extent only. Because it is possible to use a formed plate metal part, material utilization can take place to a greater extent than this is normally the case with solid components.

The face of the outer part can be provided in the form of an uninterrupted cylindrical face. However, it can also be interrupted in the circumferential direction. This means that there are obtained partial centering faces which, in the case of a constant velocity joint with a plate metal outer part, are provided in the outwardly curved regions of those portions which contain the outer running grooves. To achieve an uninterrupted centering face, it is possible to provide upset webs on the side facing away from the flange, in the region between the circumferentially adjoining outwardly curved portions containing the outer running grooves. The centering face can axially extend in portions along the entire length between the flange and the axial end facing away from the flange, but it can also be concentrated on only some regions along a short part of the length, in the region of the end facing away from the flange. This is always advantageous in those cases where upsetting takes place in the region between two circumferentially adjoining outer running grooves.

In a preferred embodiment, the flange is tensioned against a contact face of the receiving part. It is also possible to arrange an intermediate ring between the flange and the contact face. The intermediate ring can be used for damping vibrations, for example.

Furthermore, the receiving part can be used to close the axial end of the outer part which is removed from the flange. Furthermore, it is proposed in accordance with the invention to provide a cap which axially covers the outside of the flange and axially extends over part of the outer face of the receiving part. Between the portion covering the receiving part and the receiving part, there is provided a seal. Furthermore, the cap is used to attach a convoluted boot which serves to seal the constant velocity joint relative to a shaft connected to the inner part of the constant velocity joint.

Other objects and advantages of the invention will become apparent from reading the following detailed description and appended claims, and upon reference to the accompanying drawings.

BRIEF DESCRIPTION OF THE DRAWINGS

For a more complete understanding of the invention, reference should now be had to the embodiments illustrated in greater detail in the accompanying drawings and described below by way of examples of the invention. In the drawings:

FIG. 2 is a plan view of the outer part at the flange end, shown as an individual onent in an enlarged scale.

FIG. 3 is a section view along line III—III according to FIG. 2.

FIG. 4 is a section view along line IV—IV according to FIG. 2.

FIG. 5 is half a longitudinal section, in an enlarged scale, through an outer part associated with a receiving part, with an intermediate ring being arranged between the flange of the outer part and the contact face of the receiving part and with the centering face extending continuously.

FIG. 6 is a plan view of an outer part in a second embodiment in the direction of the flange.

FIG. 7 is a section view along line VII—VII according to FIG. 6.

FIG. 8 is a section view along line VIII—VIII according to FIG. 6.

DETAILED DESCRIPTION OF THE PREFERRED EMBODIMENTS

Figure 1:
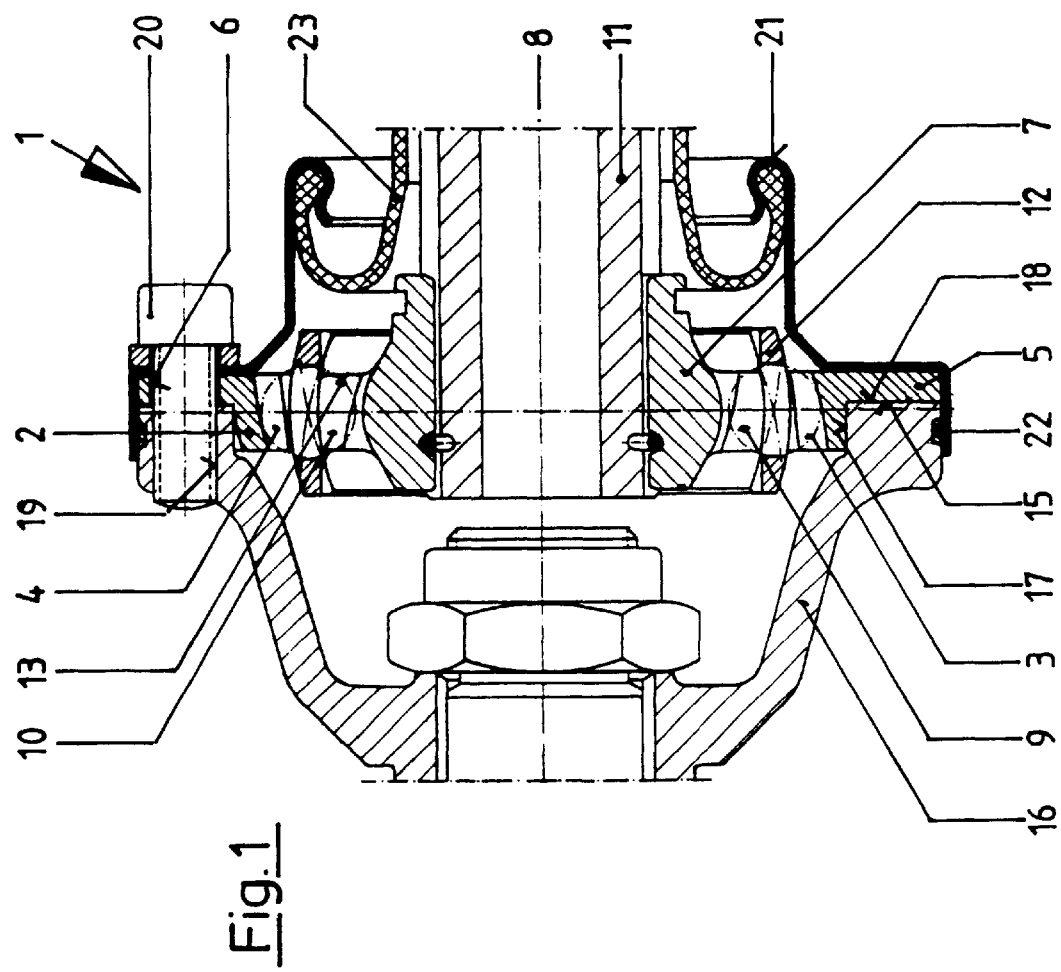
FIG. 1 is a longitudinal section through a first embodiment which comprises a constant velocity joint with an outer part formed of plate metal, and a receiving part.

FIG. 1 is a longitudinal section through the constant velocity joint 1 having an outer part 2 which is produced from a plate metal material (such as steel plate) by a non-chip producing forming operation. The outer part 2 comprises first outer running grooves 3 which start from the first axial end provided with the flange 5 and whose track base approaches the longitudinal axis 8 in the direction of the other axial end which is removed from the flange 5. Furthermore, the outer part 2 comprises second outer running grooves 4 which are shown in dashed lines only and which start from the second axial end removed from the flange 5. The track base of said second outer running grooves 4 approaches the longitudinal axis 8 in the direction of the first axial end associated with the flange 5. The flange 5 comprises circumferentially distributed through-bores 6.

The inner part 7 is received in the outer part 2. The inner part 7, in its outer face, comprises first inner running grooves 9 and second inner running grooves 10 which are alternately circumferentially arranged around the longitudinal axis 8. The first inner running grooves 9 are arranged opposite the first outer running grooves 3, and the second inner running grooves 10 are arranged opposite the second outer running grooves 4. The track base of the first inner running grooves 9 starts from the first axial end adjoining the flange 5 and extends towards the second axial end which is removed from the flange 5, while approaching the longitudinal axis 8. The course taken by the second inner running grooves 10 is reversed accordingly.

A shaft 11 is inserted in a rotationally fast way into a central bore of the inner part 7, which bore is centered on the longitudinal axis 8.

Between the outer part 2 and the inner part 7, there is arranged a cage 12. The cage 12 comprises windows which hold balls 13. The latter engage opposed pairs of outer running grooves 3, 4 and inner running grooves 9, 10.

Furthermore, the outer part 2 comprises a centering face 14, which is formed of a plurality of individual faces, as will be explained in greater detail in connection with FIGS. 2 to 4. By means of the centering face 14, the outer part 2 is received in a centered way in a cylindrical centering bore 17 of a receiving part 16 on the longitudinal axis 8. In addition, the outer part 2, by means of the flange face 15, rests against the contact face 18 of the receiving part 16. The outer part 2 is tensioned by, for example, fixing bolts 20 which are inserted through the through-bores 6 and threaded into correspondingly arranged threaded bores 19 of the receiving part 16.

The receiving part 16 covers the second axial open end of the outer part 2. The receiving part 16 can be connected to a journal, for example, which projects from a drive such as the axle differential of a motor vehicle.

Furthermore, there is provided a cap 21 which can be a plate metal part and which comprises an outer portion which extends over the outside of the flange 5, including the outer face of the receiving part 16. For sealing purposes, a seal 22 is arranged between the region of the cap 21 and the outer face of the receiving part 16. The seal 22 is positioned in a groove of the receiving part 16. The cap 21 is also secured by the fixing bolts 20. Furthermore, the free end of the cap, which extends away from the flange 5, serves for attaching a convoluted boot 23 whose other end is secured to the shaft 11, so that the interior of the constant velocity joint 1 is sealed.

FIGS. 2 to 4 show the outer part 2 as an individual component. It is possible to see the first outer running grooves 3 and second outer running grooves 4 which are formed into the outer part 2 and which are alternately arranged across the circumference, so that this region comprises outwardly curved formations. The outer faces of the formations form cylindrical partial portions of the cylindrical centering face 14 by means of which the outer part is received in the receiving part 16. The centering face 14 is thus interrupted on its circumference. Furthermore, it can be seen that there is provided a total of five through-bores 6 for passing through fixing bolts.

FIGS. 5 to 8 show an embodiment which is modified as compared to that shown in FIGS. 1 to 4. Those parts which correspond to parts of embodiments illustrated in FIGS. 1 to 4, have been given reference numbers which have been increased by 100 as compared to the corresponding parts in FIGS. 1 to 4. As far as those parts are concerned, reference is also made to the description of the embodiment according to FIGS. 1 to 4. However, the deviations will be explained in greater detail below. FIG. 5 only shows half a section of the constant velocity joint 101; there is only shown the outer part 102, but not the further components associated with the constant velocity joint 101. There is provided a receiving part 116 which comprises a cylindrical centering bore 117 in which the outer part 102, which is also a formed plate metal part, is received by means of its outer, but continuous cylindrical centering face 114. Between the flange 105 of the outer part 102 and the contact face 118 of the receiving part 116, there is inserted an intermediate ring 24 for damping vibrations. The fixing bolts 120 also pass through said intermediate ring 24. Part of the cap 121 is also shown.

The design of the outer part 102 is shown in greater detail in FIGS. 6 to 8. It can be seen that there is provided a continuous centering face 114 which is not discontinued in the circumferential direction, but it is discontinued in the direction of the longitudinal axis 8. Only the circumferentially alternating first outer running grooves 103 and second outer running grooves 104 can be seen. Between two circumferentially adjoining second outer running grooves and, respectively, between the outwardly curved formations resulting from the deformation of the wall, there are arranged rib-shaped projections which are produced by upsetting. These projections on their outer face, contain the centering face 114 which thus extends continuously all around the circumference of the outer part 102 at the second axial end, i.e., the end removed from the flange 105. The centering face 114 extends in the direction of the longitudinal axis 8, but only over part of the length between the flange 105 and the second axial end of the outer part 102 containing the outer running grooves 103, 104, which second axial end is removed from the flange 105.

From the foregoing, it can be seen that there has been brought to the art a new and improved constant velocity joint and receiving part. While the invention has been described in connection with one or more embodiments, it should be understood that the invention is not limited to these embodiments. On the contrary, the invention covers all alternatives, modifications, and equivalents as may be included in the spirit and scope of the appended claims.

What is claimed is:

1. An assembly comprising:

a constant velocity joint (1, 101) which comprises an outer part (2,102) which is axially open at both ends; an inner part (7); a cage (12); and a plurality of balls (13), wherein the outer part (2,102) and the inner part (7) are provided with running grooves (3, 4, 103, 104; 9, 10) for receiving said balls (13) and wherein the cage (12) serves to guide said balls (13), wherein the outer part (2, 102) is formed of plate metal and, at one axial end, comprises a formed-on flange (5, 105) and, towards the other axial end, on its outside, is provided with a cylindrical centering face (14, 114), and wherein the flange (5, 105) is provided with first bores (6, 106) for receiving fixing bolts (20, 120); and a receiving part (16, 116) which comprises a cylindrical centering bore (17, 117) for centrically receiving the outer part (2, 102) by way of the centering face (14, 114);

and second bores (19) which are arranged so as to correspond to the first bores (6, 106), such that the fixing bolts (20, 120) are receivable into the second bores (19) of the receiving part (16,116).

2. An assembly according to claim 1, wherein the centering face (14) is interrupted in the circumferential direction.

3. An assembly according to claim 1, wherein the flange (5, 105) is tensioned against a contact face (18, 118) of the receiving part (16, 116).

4. An assembly according to claim 3, wherein an intermediate ring (24) is arranged between the flange (105) and the contact face (118).

5. An assembly according to claim 1, wherein the receiving part (16) closes the axial end of the outer part (2) which is removed from the flange (5).

6. An assembly according to claim 1, wherein there is provided a cap (21) which axially covers the outside of the flange (5) and axially extends over part of the outer face of the receiving part (16); wherein between that part of the cap (21) which covers the receiving part (16) and the receiving part (16), there is arranged a seal (22); and wherein the cap (21) serves to attach a convoluted boot (23) for sealing the constant velocity joint (1) relative to a shaft (11) connected to the inner part (7) of the constant velocity joint (1).

* * * * *